No. 860,491. PATENTED JULY 16, 1907.
B. J. MATTINGLY.
INSECT TRAP.
APPLICATION FILED MAY 1, 1907.

WITNESSES
Samuel E. Wade.
Anna W Hart

INVENTOR
BENJAMIN J. MATTINGLY.
BY Munn & Co.
ATTORNEYS.

UNITED STATES PATENT OFFICE.

BENJAMIN JOSEPH MATTINGLY, OF BEEVILLE, TEXAS.

INSECT-TRAP.

No. 860,491.	Specification of Letters Patent.	Patented July 16, 1907.

Application filed May 1, 1907. Serial No. 371,216.

*To all whom it may concern:*

Be it known that I, BENJAMIN JOSEPH MATTINGLY, a citizen of the United States, and a resident of Beeville, in the county of Bee and State of Texas, have invented an Improved Insect-Trap, of which the following is a specification.

Figure 1:
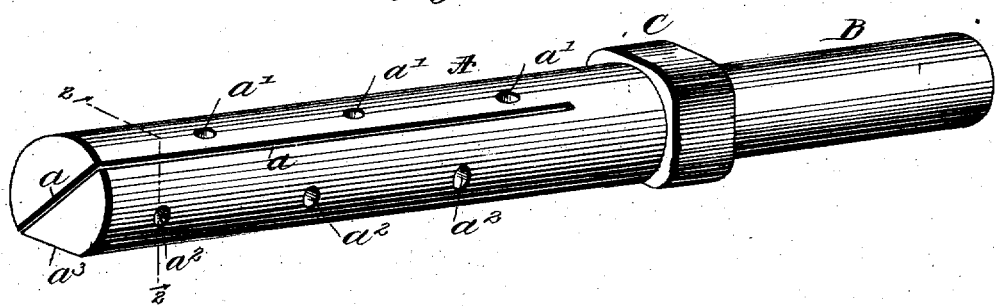
Figure 2:
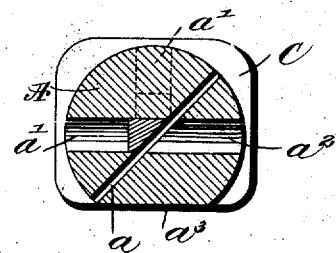

My invention is an improvement in traps for vermin of the insect type, particularly house- or bedbugs, sometimes known as "chinches". The construction of the same is as hereinafter described, and illustrated in the accompanying drawing, in which Figure 1 is a perspective view of the trap; and Fig. 2 is a cross-section on the line 2—2 of Fig. 1.

A indicates the body, B the handle, and C an intermediate portion or collar. These parts are all constructed integrally of wood, preferably pine wood, for which it is supposed bed-bugs have a particular liking. The body A is provided with a lengthwise slot $a$ diametrically through it and with a series of bores or sockets $a'$ and $a^2$ opening laterally. It will be seen that the slot $a$ opens on opposite sides and that one end of the bar or body A, constitutes two practically spring jaws, and that provision is also made for insertion of a wire or any other suitable device for removing from the slot any vermin that may collect therein. Some of the bores $a'$ may be closed at the inner end, as shown in Fig. 2, while others, $a^2$, may open into the slot $a$. The under side of the body is flat as indicated at $a^3$, and the under side of the collar or projection C is also flat, as shown in Fig. 2, and in the same plane with the part $a^3$. This form is adapted to enable the trap to lie or retain its place upon a bed slat or spring or other part upon which it may be laid.

According to their habit, the bugs will seek in the day time a hiding place from which the light is excluded, and a trap of this character affords more attractions than other hiding places which they might find in or about the bedstead. They will accordingly seek refuge in the slot $a$, the sockets $a'$, or the bores $a^2$.
By the latter they may find access to the slot $a$, and, since but little light can penetrate the latter, this will generally be preferred as a hiding place. For the purpose of destroying the vermin, the trap is seized by the handle B and the body thereof thrust into hot water, and then the dead bodies of the bugs are shaken or knocked out of the slot and sockets, when the trap is ready to be used again or the outer slotted end of the wooden bar may be rapped forcibly upon some fixed object whereby the spring jaws composing the body will be brought together so as to mash some of, or at least injure and stun, the vermin concealed in the slot. Their bodies may be removed from the slot by means of the wire or other suitable device when this method is preferred.

I claim—

1. The improved trap consisting of a wooden bar having a body portion provided with a longitudinal slot and a series of lateral openings penetrating from the outside, a handle alined with said body, and an intermediate enlarged portion whose under side and the adjacent portion of the body are flat, as shown and described.

2. The improved insect-trap formed of a wooden bar comprising a handle and an alined body portion having a longitudinal slot extending through the said body from side to side, the body having also a series of lateral sockets opening from the outside and a series of bores opening from the outside and communicating with the said slot, substantially as described.

3. The improved insect trap consisting of a bar formed of a resilient material and having a lengthwise slot extending from one end nearly to the other end of the same and opening at the outer end and on each side as shown and described.

his
BENJAMIN JOSEPH × MATTINGLY.
mark.

Witnesses:
B. H. STANLEY,
T. M. COX.